US008429847B2

(12) United States Patent
Ford

(10) Patent No.: US 8,429,847 B2
(45) Date of Patent: Apr. 30, 2013

(54) DEEP DIVING FISHING LURE

(75) Inventor: Randolph K. Ford, Stayner (CA)

(73) Assignee: 2327086 Ontario Ltd., Nottawa, Ontario (CA)

( * ) Notice: Subject to any disclaimer, the term of this patent is extended or adjusted under 35 U.S.C. 154(b) by 82 days.

(21) Appl. No.: 12/799,373

(22) Filed: Apr. 23, 2010

(65) Prior Publication Data
US 2011/0258906 A1 Oct. 27, 2011

(51) Int. Cl.
*A01K 85/00* (2006.01)

(52) U.S. Cl.
USPC ............ 43/42.22; 43/42.23; 43/42.47

(58) Field of Classification Search ........... 43/42.47, 43/42.22, 42.23, 43.13
See application file for complete search history.

(56) References Cited

U.S. PATENT DOCUMENTS

| 1,220,921 | A | * | 3/1917 | Wilson | 43/42.22 |
| 1,232,211 | A | * | 7/1917 | Burkman | 43/42.22 |
| 1,419,540 | A | * | 6/1922 | Brown | 43/42.23 |
| 1,423,025 | A | * | 7/1922 | Rodgers et al. | 43/42.23 |
| 1,542,404 | A | * | 6/1925 | Paulson | 43/42.22 |
| 1,600,653 | A | * | 9/1926 | Steenstrup | 43/42.23 |
| 1,622,063 | A | * | 3/1927 | Steenstrup | 43/42.23 |
| 1,694,195 | A | * | 12/1928 | Watts | 43/42.47 |
| 2,062,718 | A | * | 12/1936 | Kallberg | 43/43.13 |
| 2,079,883 | A | * | 5/1937 | Valasek | 43/42.49 |
| 2,579,991 | A | * | 12/1951 | Wood | 43/42.47 |
| 2,598,771 | A | * | 6/1952 | Eder | 43/42.47 |
| 2,608,016 | A | * | 8/1952 | Shipley | 43/42.47 |
| 2,618,093 | A | * | 11/1952 | Isaac | 43/42.22 |
| 2,618,096 | A | * | 11/1952 | Wagner | 43/42.47 |
| 2,621,438 | A | * | 12/1952 | Helin | 43/42.44 |
| 2,663,963 | A | * | 12/1953 | Russell | 43/42.49 |
| 2,682,128 | A | * | 6/1954 | Weigandt | 43/42.22 |
| 2,753,648 | A | * | 7/1956 | Paterno | 43/42.47 |
| 2,776,517 | A | * | 1/1957 | Borgstrom | 43/42.47 |
| 2,789,386 | A | * | 4/1957 | Creelman | 43/42.22 |
| 2,883,785 | A | * | 4/1959 | Croft | 43/42.22 |
| 2,904,921 | A | * | 9/1959 | Purgason et al. | 43/42.22 |
| 2,976,642 | A | * | 3/1961 | Wickman et al. | 43/42.23 |
| 3,462,871 | A | * | 8/1969 | McVay | 43/42.47 |
| 3,490,165 | A | * | 1/1970 | Thomassin | 43/42.47 |
| 3,583,089 | A | * | 6/1971 | Scarbro | 43/43.13 |
| 3,643,370 | A | * | 2/1972 | Cook et al. | 43/43.13 |
| 3,844,059 | A | * | 10/1974 | Weber | 43/43.13 |
| 3,897,648 | A | * | 8/1975 | Neary | 43/43.13 |
| 3,902,267 | A | * | 9/1975 | Monchil | 43/42.47 |
| 3,940,872 | A | * | 3/1976 | Weber | 43/43.13 |
| 3,950,882 | A | * | 4/1976 | Monchil | 43/42.23 |
| 3,971,154 | A | * | 7/1976 | Craig | 43/42.23 |
| 4,006,552 | A | * | 2/1977 | Cunningham | 43/42.49 |
| 4,129,956 | A | * | 12/1978 | Neary | 43/43.13 |

(Continued)

FOREIGN PATENT DOCUMENTS

JP 10117638 A * 5/1998
JP 10136836 A * 5/1998

(Continued)

*Primary Examiner* — Darren W Ark
(74) *Attorney, Agent, or Firm* — Olson & Cepuritis, Ltd.

(57) ABSTRACT

A deep diving fishing lure having a forwardly-extending diving lip is provided with a fore-and-aft pivotable lure positioning arm mounted to the diving lip. The lure positioning arm, when locked in aft position, maintains the lure in a diving position when pulled through a body of water but negates the lure's tendency to dive when released from the aft position.

8 Claims, 3 Drawing Sheets

U.S. PATENT DOCUMENTS

| | | | | |
|---|---|---|---|---|
| 4,161,078 A * | 7/1979 | Pagani | | 43/42.22 |
| 4,212,127 A * | 7/1980 | Daniels | | 43/43.13 |
| 4,215,507 A * | 8/1980 | Russell | | 43/42.22 |
| 4,282,672 A * | 8/1981 | Neary | | 43/43.13 |
| 4,567,687 A * | 2/1986 | Even et al. | | 43/43.13 |
| 4,581,842 A * | 4/1986 | Kalberer | | 43/43.13 |
| 4,739,576 A * | 4/1988 | Davis | | 43/42.47 |
| 4,777,761 A * | 10/1988 | Renaud | | 43/42.47 |
| 4,807,388 A * | 2/1989 | Cribb | | 43/42.22 |
| 4,819,365 A * | 4/1989 | Landuydt | | 43/42.47 |
| 4,893,431 A * | 1/1990 | Ehlers | | 43/42.47 |
| 5,168,652 A * | 12/1992 | Davis | | 43/42.23 |
| 5,255,467 A * | 10/1993 | Haskell | | 43/42.22 |
| 5,337,508 A * | 8/1994 | Pfeiffer | | 43/42.22 |
| 5,339,561 A * | 8/1994 | Weber | | 43/43.13 |
| 5,425,193 A * | 6/1995 | Gelb | | 43/4 |
| 5,560,143 A * | 10/1996 | Allen | | 43/42.47 |
| 5,678,349 A * | 10/1997 | Pacora | | 43/42.09 |
| 5,937,569 A * | 8/1999 | Solheim et al. | | 43/42.47 |
| 6,016,622 A * | 1/2000 | Even | | 43/43.13 |
| 6,578,313 B1 * | 6/2003 | Knol | | 43/42.47 |
| 6,931,784 B1 * | 8/2005 | Sutherland | | 43/42.22 |
| 7,107,720 B2 * | 9/2006 | Burggrabe et al. | | 43/42.47 |
| 7,162,829 B2 * | 1/2007 | Braaten | | 43/42.23 |
| 7,316,095 B1 * | 1/2008 | Petner et al. | | 43/42.22 |
| 7,520,087 B1 * | 4/2009 | Even | | 43/43.13 |
| 7,520,088 B2 * | 4/2009 | Even | | 43/43.13 |
| 7,621,068 B1 * | 11/2009 | Renosky | | 43/42.47 |
| 7,703,235 B2 * | 4/2010 | Ford | | 43/42.22 |
| 7,726,062 B2 * | 6/2010 | Davis | | 43/42.47 |
| 2008/0104876 A1 * | 5/2008 | Ito | | 43/42.47 |
| 2008/0104881 A1 * | 5/2008 | Ito | | 43/42.47 |
| 2008/0155884 A1 * | 7/2008 | Sisson | | 43/42.47 |
| 2011/0239524 A1 * | 10/2011 | Ford | | 43/43.13 |
| 2011/0252691 A1 * | 10/2011 | Heyne | | 43/43.13 |

FOREIGN PATENT DOCUMENTS

| | | | |
|---|---|---|---|
| JP | 11113450 A | * | 4/1999 |
| JP | 2000270717 A | * | 10/2000 |
| JP | 2000342118 A | * | 12/2000 |
| JP | 2001000078 A | * | 1/2001 |
| JP | 2004298132 A | * | 10/2004 |
| JP | 2005143446 A | * | 6/2005 |
| JP | 2005185257 A | * | 7/2005 |
| JP | 2006197877 A | * | 8/2006 |
| JP | 2007195482 A | * | 8/2007 |
| JP | 2010081831 A | * | 4/2010 |
| WO | WO 03101190 A1 | * | 12/2003 |

* cited by examiner

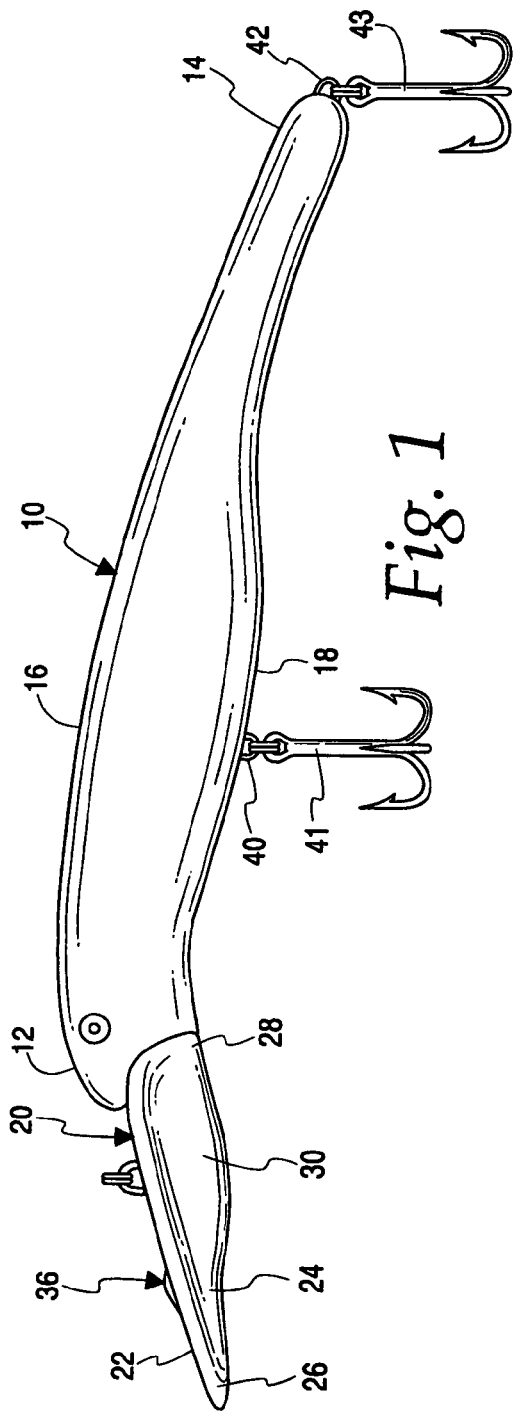
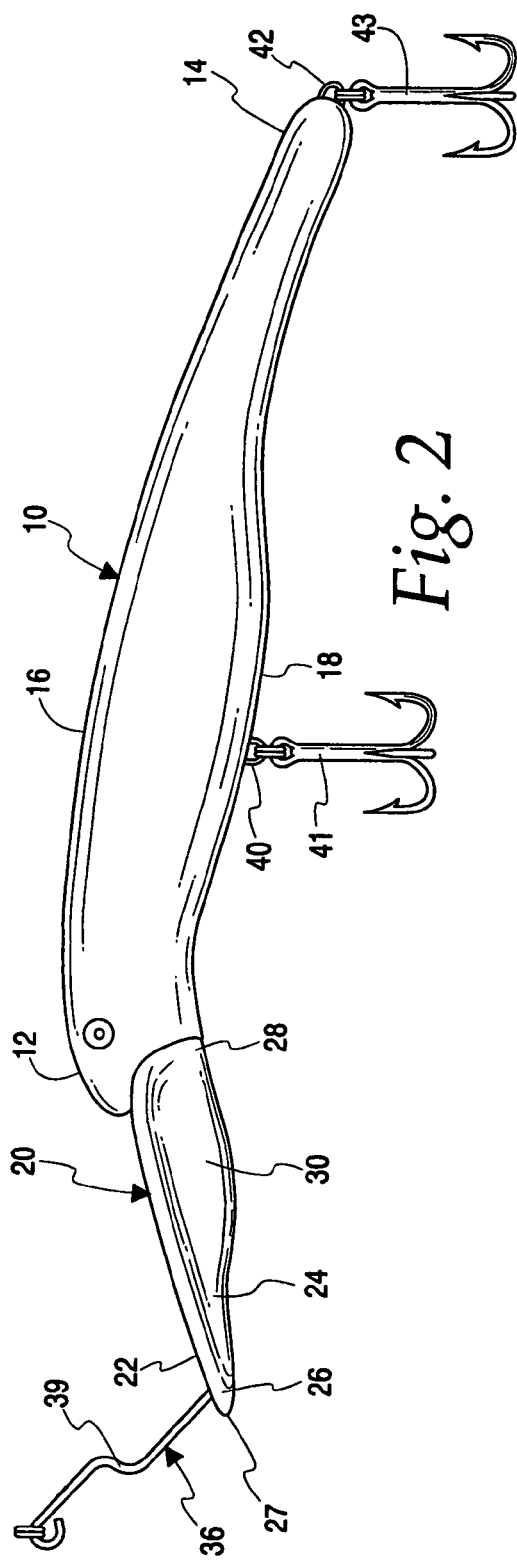
Fig. 1
Fig. 2

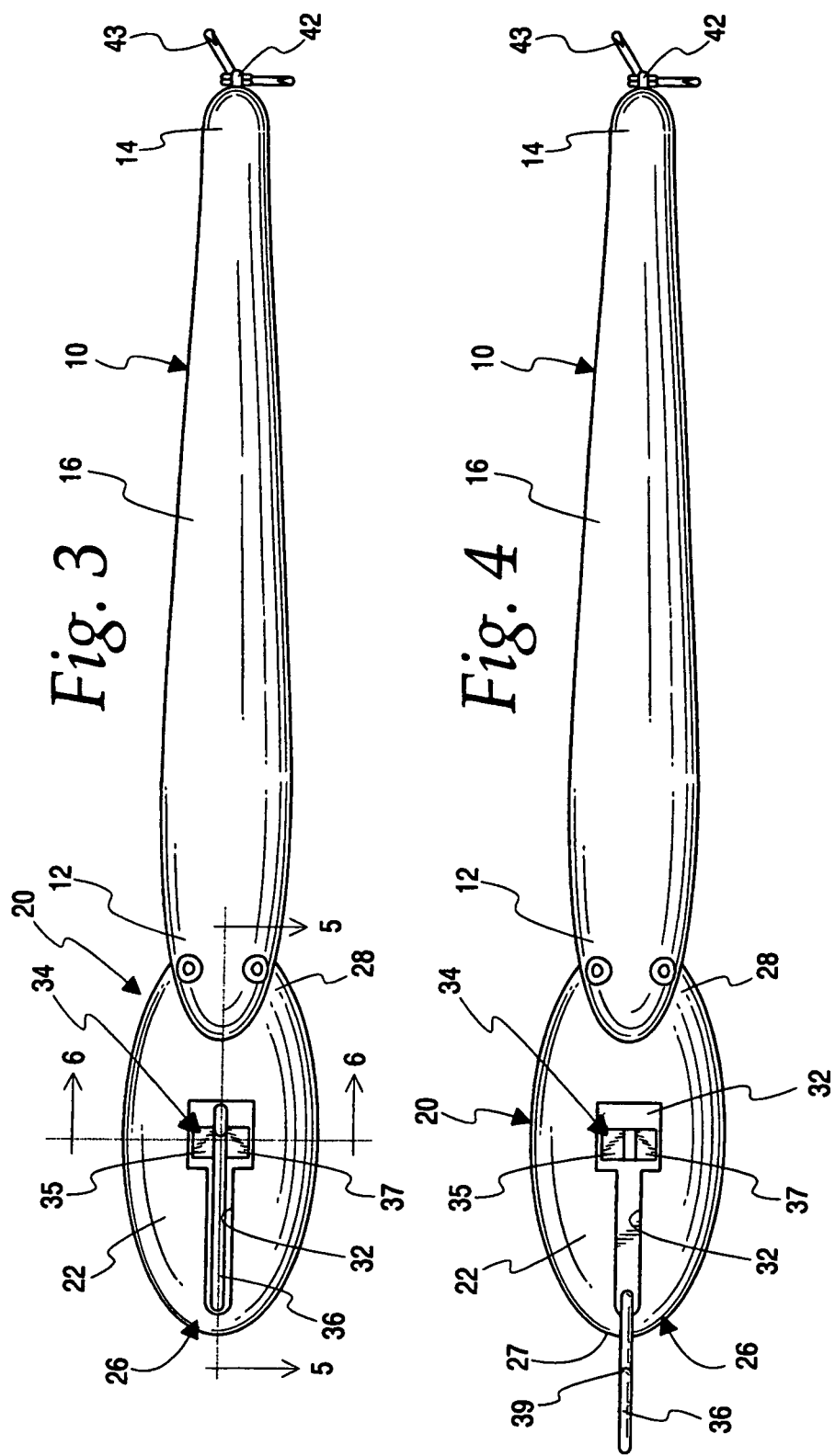

DEEP DIVING FISHING LURE

FIELD OF THE INVENTION

The present invention relates to hydrodynamic fishing devices, and in particular to fishing tackle of the diver sinking type lure, also known as a crankbait.

BACKGROUND OF THE INVENTION

Fishing lures are old in the art. In order to target fish that do not strike bait floating at the surface or those that remain well below the surface, many fishermen use lures designed to dive to various depths within the water. This type of lure is typically buoyant or neutrally buoyant, but is designed to dive below the surface when trolled through the water. Different shaped, colored, and sized lures are used to target different species of fish or based on current water conditions.

Crankbaits known in the prior art usually have a solid lure body with one or more fish hooks attached. A diving plate or lip extends from the first end portion of the lure body, generally angled downwardly relative to the body of the lure. Usually, a fishing line is attached to the diving lip with the other end of the line being wound around a reel or the like, such that when the reel is turned or cranked the lure moves through the water. Water flowing over the diving lip generates a downward force on the lure body forcing it to dive deeper in the water as the lure is pulled forwardly through the water. The lateral width of the diving lip at its widest point should be wider than the widest part of the lure body; however, the diving lip should taper such that the rear portion of the diving lip is nearly the same width as the first end portion of the lure body where the diving lip and lure body meet. This tapered area allows the water flowing over the diving lip creating the downward force to flow off the diving lip before reaching the lure body thereby reducing wobble or roll of the lure body as it moves through the water.

Due to their hydrodynamic properties, diving fishing lures are difficult to retrieve, with or without a fish having been hooked by the lure, because forward movement of the lure causes the lure to dive. The present invention effectively removes or at least ameliorates this shortcoming of diving fish lures.

SUMMARY OF THE INVENTION

A diving fishing lure of the present invention facilitates retrieval of the lure from a body of water as well as setting the hook and landing a fish caught by the lure by immediate repositioning the lure relative to a fishing line during retrieval or while reeling in a fish.

The present fishing lure has an elongated lure body terminating at first and second end portions and provided with a diving lip at the first end portion. The diving lip extends downwardly away from the lure body at an acute angle relative to the longitudinal axis of the lure body. The diving lip has a top surface that defines a diving plane, a convex bottom surface, a front portion and a rear portion. A latch with a pivotable lure positioning arm and a catch for the arm are mounted to the diving lip. The proximal end portion of the arm is pivotably mounted to the diving lip for fore-and-aft movement relative to the diving lip and so that the arm extends away from the top surface of the diving lip. The catch releasably holds the lure positioning arm in a fixed aft position, thereby orienting the diving lip so as to cause the lure to dive downwardly when pulled through a body of water by a fishing line attached to the lure positioning arm. When the arm is not held by the catch and is oriented in a fore position, the arm is substantially aligned with the diving plane when the lure is pulled through a body of water, thereby negating the tendency of the lure to dive.

BRIEF DESCRIPTION OF THE DRAWINGS

In the accompanying drawings that form part of the specification, and in which like numerals are employed to designate like parts throughout the same, FIG. 1 is a side elevation view of the lure with the lure positioning arm in the aft position.

FIG. 2 is a side elevation view of the lure with the lure positioning arm released from the aft position.

FIG. 3 is a top view of the lure with the lure positioning arm in the aft position.

FIG. 4 is a top view of the lure with the lure positioning arm in the fore position.

DESCRIPTION OF THE PREFERRED EMBODIMENT

Figure 5:
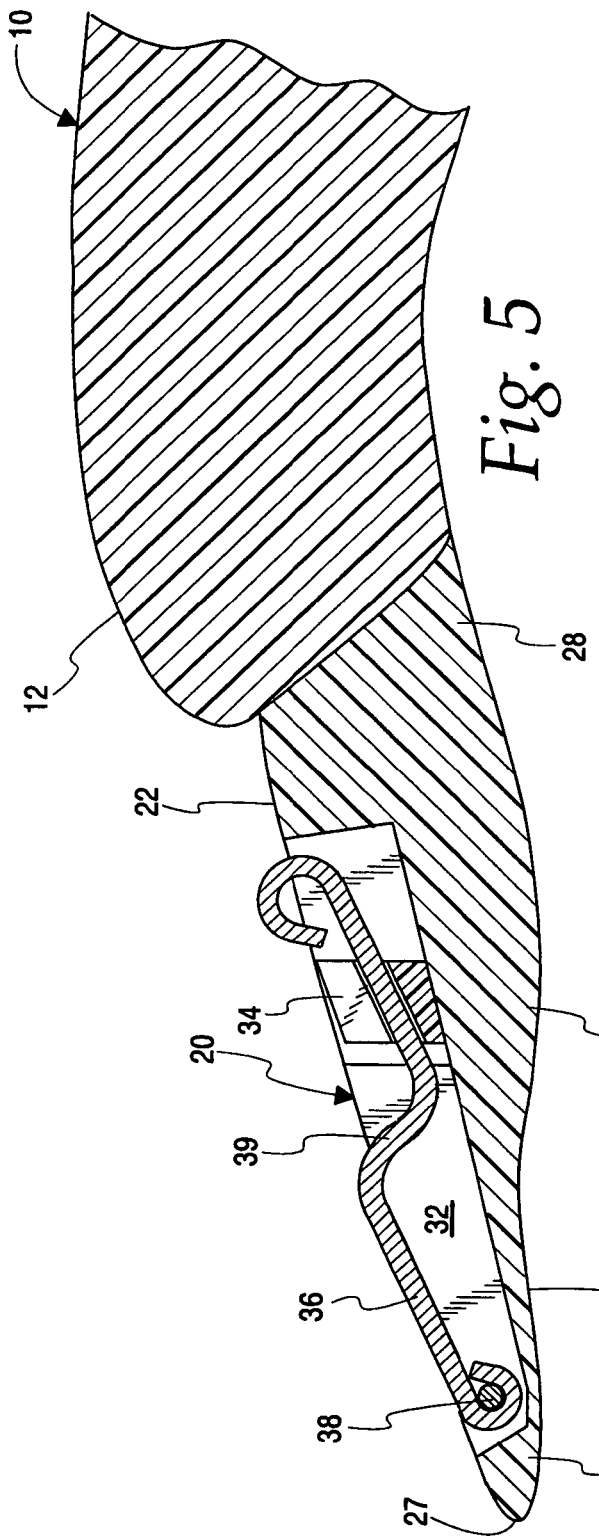
FIG. 5 is a cross sectional view of the lure of FIG. 3 taken along plane 5-5.

A deep diving fishing lure embodying the present invention has a diving lip extending from an elongate lure body. Within the diving lip is situated a latch with a catch and a pivotable lure positioning arm. In the latched position, the lure positioning arm facilitates the lure diving downward in the water upon trolling; in the released position, the lure positioning arm positions the lure to negate the tendency to dive thereby facilitating retrieval of the lure from the water.

Referring to the drawings and particularly to FIG. 1, an elongate lure body 10 is depicted having a first end portion or head portion 12, a second end portion or tail portion 14, a top side 16, and a bottom side 18. A diving lip 20 extends from the first end portion 12 of the lure body 10. Diving lip 20 has a top surface 22, a convex bottom surface 24, a front portion 26, and rear portion 28. A latch located within diving lip 20 includes lure positioning arm 36 which is pivotably mounted to the front portion 26 of diving lip 20 for fore-and-aft movement, and is adapted for attachment to a fishing line at the proximal end portion 37. When in the latched position, lure positioning arm 36 facilitates the lure diving downward in the water upon trolling. A fin 30 protruding from the bottom surface 24 of the diving lip 20 extends longitudinally along the centerline of the lure from approximately the midpoint of the underside of the diving lip 20 to the rear portion 28 of the diving lip. Eyelets 40 and 42 extend from the underside of the lure body 10 for respective attachment of fish hooks 41, 43 or the like.

Referring to FIG. 2, lure positioning arm 36 is depicted released from the aft position. In the preferred embodiment, lure positioning arm 36 is provided with an offset portion 39. This offset is desirable to avoid a change in the profile of the diving lip and thus its diving characteristics.

Referring to FIGS. 3 and 4, top views of fishing lure 10 are depicted. Catch 34 is located in groove 32 within the body of diving lip 20 and includes a pair of upstanding, tapered cusps 35 and 37 spaced from one another to receive lure positioning arm 36 therebetween. Cusps 35 and 37 are configured for back-and-forth movement relative to one another. As shown in FIG. 3, catch 34 is made of a flexible material and releasably holds lure positioning arm 36 in the aft position during trolling. In the latched aft position, lure positioning arm 36 facilitates the downward diving motion of lure 10. In response to the strike of a fish, catch 34 releases lure positioning arm 36, permitting the arm to move to the fore position, thereby facilitating retrieval of the lure and, if the fish is caught, prompt setting of the hook and landing the hooked fish. FIG. 4 depicts lure positioning arm 36 in the released, fore position. Preferably, catch 34 does not project above the top surface 22 of diving lip 20 but is flush with top surface 20 when in the latched aft position.

Figure 6:
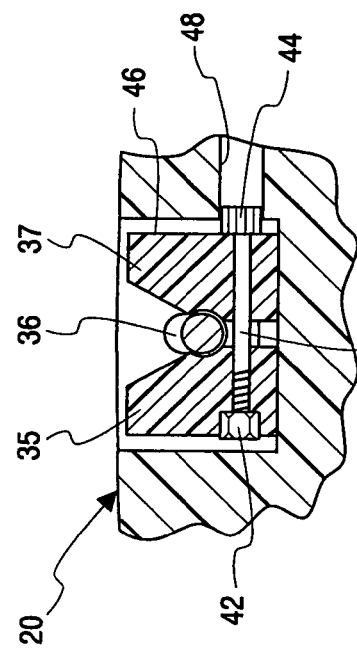
FIG. 6 is a cross sectional view of the diving lip of the lure of FIG. 3 taken along plane 6-6.

Cross-sectional views of lure 10 are depicted in FIGS. 5 and 6. Referring to FIG. 5, in the preferred embodiment catch 34 is located entirely within groove 32 thereby reducing drag through the water. The pivot axis about which lure positioning arm 36 pivots is defined by pin 38, also located within groove 32 and at or near the front portion 26 of diving lip 20, preferably about one-tenth of the length of the diving lip away from the leading edge 27 of the lip. All or nearly all of lure positioning arm 36 is located within groove 32 further reducing drag as the lure moves through the water.

Referring to FIG. 6, a cross-sectional view of the diving lip 20 is depicted. Catch 34 releasably holds lure positioning arm 36 in the aft position. In the preferred embodiment, catch 34 is responsive to the strike of a fish and releases lure positioning arm 36 so that arm 36 can move to the fore position, facilitating removal of the lure from the water.

Figure 7:
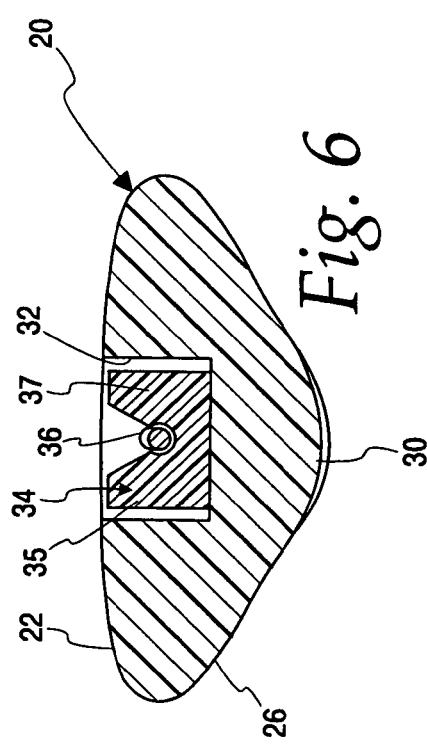
FIG. 7 is a fragmentary sectional view illustrating an embodiment that utilizes an adjustable catch for receiving a lure positioning arm.

The tapered cusps of the catch releasably holding the lure positioning arm can be situated at a fixed spacing from one another, as shown in FIGS. 3-6, or the spacing thereof can be adjustable as shown in FIG. 7. In particular, cusps 35 and 37 of catch 34 are spaced from one another and the spacing therebetween can be adjusted by a fastener connecting cusps 35 and 37 and passing through the cusps, such as socket cap screw 40 threadedly received in nut 42 which, in turn, is embedded in cusp 35. Socket head 44 of socket cap screw 40 abuts outboard side 46 of cusp 37. As socket head 44 is turned clockwise, socket cap screw 40 is threaded into nut 42, cusps 35 and 37 are drawn toward one another, reducing the spacing therebetween, and thereby tightening the grip on lure positioning arm 36 situated between cusps 35 and 37. Similarly, as socket head 44 is turned counterclockwise, cusps 35 and 37 seek to return to their original positions, the space therebetween is increased, and grip on lure positioning arm 36 is loosened.

Socket head 44 is situated in channel 48 defined in diving lip 20 and is provided with a socket adapted to receive a drive such as an Allen drive. If desired, the socket can be chosen to receive other drive types such as slotted, Phillips ("crosshead"), Robertson ("square"), and the like.

The contour of diving lip 20 preferably is such that the width of lip 20 gradually increases in a direction from leading edge 27 of front portion 26 to a maximum at a point intermediate the length of diving lip 20 and then decreases as the rear portion 28 approaches and ultimately adjoins lure body 10 at the head portion 12 thereof.

The foregoing specification and the drawings are intended as illustrative but are not to be taken as limiting of the present invention. Still other variations and rearrangements of parts are possible without a departure from the spirit and scope of the present invention.

What is claimed is:

1. A deep diving fishing lure, comprising:
an elongate lure body having head and tail portions, a topside, an underside, and a longitudinal axis;
a diving lip extending away from the head portion at a downward angle relative to the longitudinal axis of the lure body,
said diving lip having a top surface, a bottom surface, a front portion, and a rear portion;
a fore-and-aft pivotable lure positioning arm pivotalby mounted to the diving lip and extendable above the top surface of the diving lip, the lure positioning arm terminating at a distal end thereof in an eyelet for attachment of a fishing line;
a catch adapted to releasably engage the lure positioning arm, wherein:
the catch releasably holds the lure positioning arm in a fixed aft position causing the lure to dive downwardly when pulled through the water by a fishing line attached to the lure positioning arm and releases the lure positioning arm when a fish strikes the lure; and
at least one eyelet extending from said underside of said lure body for attachment of a fishing hook; wherein:
the lure positioning arm pivots about an axis located at the front portion of the diving lip less than about 1/10 of a length of the diving lip away from a front edge thereof.

2. A lure as in claim 1, wherein:
an additional eyelet for attaching a fish hook extends from said tail portion of said lure body.

3. A lure as in claim 1, wherein:
a width of said diving lip increases from said front portion to a maximum at a point intermediate the length of the diving lip, and thereafter decreases until the rear portion thereof adjoins the lure body,
wherein a maximum lateral width of said diving lip is greater than a lateral width of said lure body.

4. A lure as in claim 1, further comprising:
a fin protruding from the bottom surface of said diving lip extending longitudinally from near a midpoint of the bottom surface of the diving lip to the rear portion of said diving lip.

5. A lure as in claim 1, wherein:
the catch has a pair of spaced opposed cusps capable of back-and-forth movement relative to one another; and
a fastener for adjusting spacing between the cusps is operably associated with the cusps.

6. A lure as in claim 5 wherein:
the fastener is a socket cap screw that passes through the cusps and is threadedly engaged with a nut embedded in one of the cusps.

7. A deep diving fishing lure, comprising:
an elongate lure body having head and tail portions, a topside, an underside, and a longitudinal axis;
a diving lip extending away from the head portion at a downward angle relative to the longitudinal axis of the lure body,
said diving lip having a top surface, a bottom surface, a front portion, and a rear portion;
a fore-and-aft pivotable lure positioning arm pivotably mounted to the diving lip and extendable above the top surface of the diving lip, the lure positioning arm terminating at a distal end thereof in an eyelet for attachment of a fishing line;
a catch adapted to releasably engage the lure positioning arm, wherein:
the catch releasably holds the lure positioning arm in a fixed aft position causing the lure to dive downwardly when pulled through the water by a fishing line attached to the lure positioning arm and releases the lure positioning arm when a fish strikes the lure; and at least one eyelet extending from said underside of said lure body for attachment of a fishing hook; wherein:

said top surface of the diving lip defines a longitudinally extending groove;

a catch having a pair of opposed cusps within said groove is positioned so that a top of said catch is flush with said top surface of the diving lip; and said lure positioning arm is received within said groove.

8. A fishing lure, comprising:

an elongate lure body having first and second end portions, a topside and an underside, and a longitudinal axis;

a diving lip extending from said first end portion of said lure body, and having a width and a length along the longitudinal axis of the lure body greater than the width, said diving lip having a top surface defining a diving plane, a bottom surface, and front and rear portions;

a latch located on said top surface of said diving lip, said latch including a fore-and-aft pivotable lure positioning arm extendable above the top surface of the diving lip and an adjustable catch for the lure positioning arm, the lure positioning arm being adapted for attachment to a fishing line, the catch releasably holding the lure positioning arm in a fixed aft position causing the lure to dive downwardly when pulled through the water by a fishing line attached to the lure positioning arm; and at least one eyelet extending from the underside of said lure body for attachment of a fishing hook;

said adjustable catch having a pair of adjustably spaced, opposed cusps and a socket cap screw that passes through the cusps and is threadedly engaged with a nut embedded in one of the cusps for adjusting the space between the opposed cusps.

\* \* \* \* \*